United States Patent [19]

Price et al.

[11] Patent Number: 4,653,614
[45] Date of Patent: Mar. 31, 1987

[54] SELF-ENERGIZING DISC BRAKES

[75] Inventors: Anthony G. Price; David Parry, both of Gwent, Wales; Roy Campbell, Worcestershire, England

[73] Assignee: Lucas Industries Public Limited Company, Birmingham, England

[21] Appl. No.: 766,108

[22] Filed: Aug. 15, 1985

[30] Foreign Application Priority Data

Aug. 18, 1984 [GB] United Kingdom ............... 8421047
Jan. 17, 1985 [GB] United Kingdom ............... 8501219
Jan. 17, 1985 [GB] United Kingdom ............... 8501220

[51] Int. Cl.$^4$ ............................................. F16D 55/18
[52] U.S. Cl. ................................... 188/70 B; 188/72.2
[58] Field of Search .................. 188/70 B, 72.2, 82.84, 188/136

[56] References Cited

U.S. PATENT DOCUMENTS 2,957,550 10/1960 Burnett ............................ 188/70 B
2,968,367 1/1961 Burnett ............................ 188/70 B
3,717,226 2/1973 Rees ............................. 188/72.2 X

FOREIGN PATENT DOCUMENTS 2231916 1/1973 Fed. Rep. of Germany .... 188/70 B

Primary Examiner—Duane A. Reger
Attorney, Agent, or Firm—Oldham, Oldham & Weber Co.

[57] ABSTRACT

In a self-energizing disc brake of the spreading type the recesses in the pressure plates in which the balls are housed, are machined directly into the material of the plates on pitch circles in the two plates of corresponding diameters. Each recess comprises an inclined ramp surface terminating at opposite ends in first and second end portions of which the end portion at the deeper end is engaged by the ball in an "off" position of brake, and the second portion is engaged by the ball to preclude further relative angular movement between the plates in brake-applying direction, thereby indicating a "wear stop". In addition ramp surfaces of different slopes may be located between the end portions so that an increased brake-applying effort towards a fully worn lining condition provides a wear warning device.

10 Claims, 7 Drawing Figures

SELF-ENERGIZING DISC BRAKES

This invention relates to self-energising disc brakes of the kind in which rotatable friction discs provided with linings of friction material are adapted to be brought into engagement with spaced opposed radial surfaces in a housing by pressure plates located between the friction discs and centred by stationary pilot lugs, balls or rollers are located in co-operating oppositely inclined angularly spaced recesses in the adjacent faces of the pressure plates, and the application of the brake is initiated by moving the pressure plates angularly in opposite directions, the pressure plates then moving apart by a tendency for the balls or rollers to ride up ramps defined by the edges of the recesses so that the pressure plates move into engagement with the friction discs which are urged into engagement with the radial surfaces, the pressure plates being carried round with the friction discs until one is arrested by the engagement of a lug on the plate with a drag-taking stop abutment in the housing, and the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

We are aware of U.S. Pat. No. 3,343,632 in which the brake is operated for normal service braking by means of fluid-pressure actuator which is located within the housing. The actuator comprises a cylinder body having a bore in which work a pair of opposed pistons acting at their outer ends between lugs on the pressure plates in order to move the plates angularly in opposite directions when fluid under pressure is admitted to a pressure space between adjacent end of the two pistons. A pair of tension springs acting between the lugs co-operate with relatively movable components of an automatic adjuster. The tension springs act as return springs to urge the pistons into retracted positions in a "off" position of the brake, and to assist in preventing the pistons from separating from the cylinder body.

According to our invention, in a self-energising disc brake of the kind set forth the brake is operated hydraulically for normal service operation by means of an hydraulic actuator which is located within the housing, the actuator comprising a cylinder body which has a bore of which the axis is tangential to the plates and in which works at least one piston for co-operation with a lug on one of the pressure plates, the co-operation of the piston with the lug causing the pressure plate to move angularly to initiate application of the brake when hydraulic fluid under pressure is admitted to a pressure space defined in the bore acts on the piston, and the recesses in the pressure plates are so constructed and arranged that the engagement of the balls or rollers with the ramps at a predetermined relative angular position between the pressure plates precludes further relative angular movement between the plates in that direction and provides a stop to prevent further movement the piston in an outward brake-applying direction with respect to the bore.

The piston is thereby prevented from separating from the housing and other movement limiting means are unnecessary.

Preferably the recesses are machined directly into the material of the pressure plates and complementary pairs of the recesses lie on corresponding pitch circles in the two plates, each recess comprises an inclined ramp surface terminating at opposite ends in first and second end portions of which the first end portion at the deeper end of the recess is engaged by the ball or roller when the pressure plates are urged towards each other in an "off" position of the brake, and the second end portion is engaged by the ball or roller to preclude the said further relative angular movement between the plates in a brake-applying direction.

The engagement of the ball or roller with the second end portion is chosen to indicate a position in which the friction linings are substantially worn and it therefore constitutes a "wear stop" to prevent further operation of the brake In addition the ramps may be constructed and arranged to provide surfaces of different relative slopes so that the input effort required to produce a given braking force increases noticeably towards the fully worn lining condition, thereby providing a wear warning device for the user.

The cylinder body may be carried by the housing and be provided with a through-bore in which works a pair of opposed pistons for co-operation at their outer ends between lugs on the pressure plates which are separated when the pressure space is pressurised.

The cylinder body may be carried by a part of the housing provided with one of the radial surfaces, and may comprise a plate for closing the open end of a casing, which together constitute the housing, and the cylinder body may be formed as a one-piece casting with the plate which facilitates construction.

Preferably opposite ends of the cylinder body comprise abutment faces to define drag-taking stop abutments, each adapted to arrest movement of a respective one of the pressure plates in the application of the brake, depending upon the direction of rotation of the friction discs.

This facilitates construction since the normal drag-taking abutment or anchor pin can be omitted.

Some embodiments of our invention are illustrated in the accompanying drawings in which.

Figure 1:
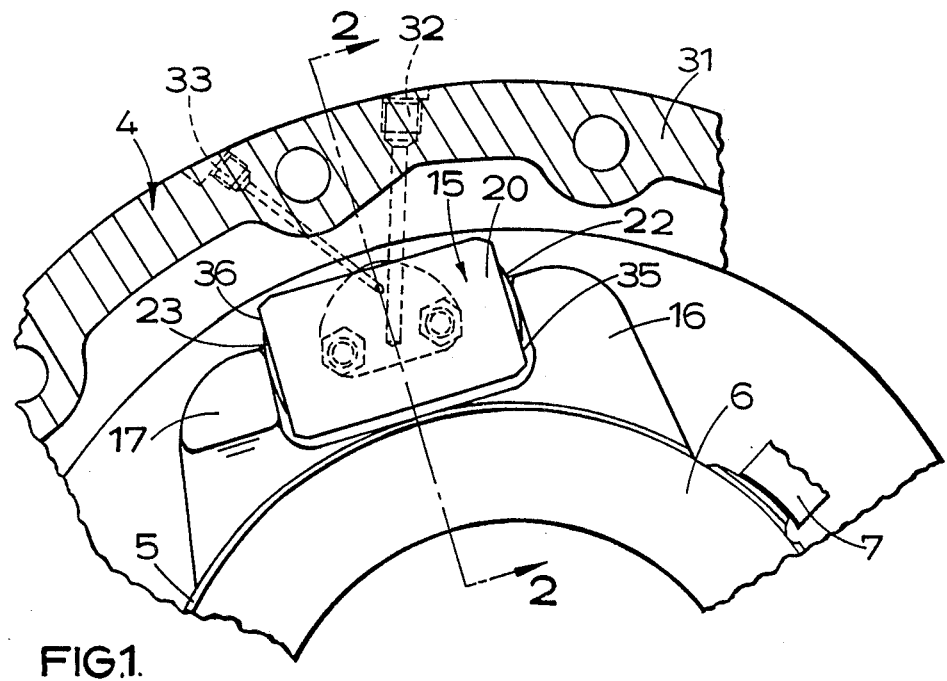
FIG. 1 is an end view of a portion of a spreading brake.
Figure 2:
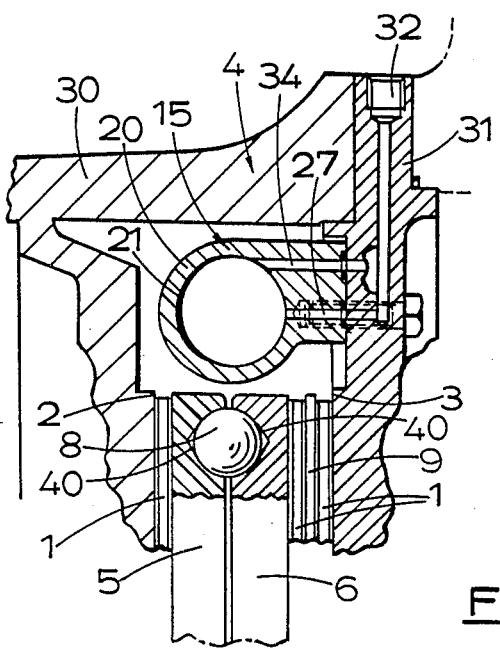
FIG. 2 is a section on the line 2—2 of FIG. 1.

The brake illustrated in the drawings is of a spreading type in which three rotatable friction discs 1 provided on opposite sides with linings of friction material are adapted to be brought into engagement with spaced opposed radial surfaces 2, 3 in a housing 4 by pressure plates 5, 6 located between an adjacent pair of the discs 1 and centred by three angularly spaced stationary pilots of which only one is shown at 7. Balls 8 are located in co-operating oppositely inclined recesses 40 in the adjacent faces of the pressure plates 5, 6. An intermediate plate 9 is disposed between the friction discs 1 of the pair disposed between the plate 6 and the surface 3.

The application of the brake is initiated by moving the pressure plates 5, 6 angularly in opposite directions which causes the pressure plates 5, 6 to move axially relatively away from each other due to the tendency for the balls 8 to ride up ramps defined by the end faces of the recesses 40. This urges the friction discs into engagement with the radial surfaces 2 and 3 on the housing 4. The pressure plates 5, 6 are then carried round with the discs 1 until one is arrested by the engagement of a lug on a respective plate with a drag-taking abutment, as will hereinafter be described, whereafter continued angular movement of the other plate provides a servo action.

The brake is applied mechanically for parking or in an emergency by a pull-rod (not shown) which extends through a radial opening in the housing 4 and is coupled to the outer ends of a pair of toggle links of which the inner ends are pivotally connected to respective pressure plates.

For normal service braking the brake is applied hydraulically by an hydraulic actuator 15 which acts between lugs 16 and 17 on the respective pressure plates 5, 6. The lugs 16 and 17 are displaced angularly from the toggle links.

The actuator 15 comprises a cylinder 20 having an open-ended longitudinal through-bore 21 in which work a pair of oppositely acting pistons 22, 23 for engagement with the lugs 16 and 17. Each piston 22, 23 may work through a seal adjacent to the adjacent outer end of the cylinder 20 and carries a seal adjacent to its inner end. A pressure space defined in bore 21 between adjacent inner ends of the pistons 22 and 23 is connected to a master cylinder through a passage 27.

The housing 2 comprises a casing 30 of bell-shaped outline, and an end plate 31 closing the open end of the casing 30. The braking surfaces 2 and 3 are defined by the inner faces of the casing 30 and of the plate 31, respectively.

The cylinder 20 is carried from the inner face of the plate 31 which, in turn, is provided with externally accessible supply and bleed passages 32 and 33 which connect with the passage 27 and with a bleed passage 34 in the cylinder 20, respectively. The axis of the bore 21 is tangential to the pressure plates 5 and 6. In a modification, the cylinder 20 may be cast as an integral part of the plate 31.

The opposite outer ends of the cylinder 20 define stop abutment surfaces 35, 36 with which the lugs 16 and 17 are alternatively engageable to arrest rotation of the respective pressure plate 5, 6 when the brake is applied, either mechanically or hydraulically. The drag on the pressure-plates is thereby transmitted to the housing 4 through the cylinder 20 and the conventional drag-taking abutment can therefore be omitted.

The angularly spaced recesses 40 which are located on pitch circles typically of constant and equal diameters are machined in the adjacent faces of the two pressure plates 5 and 6 and the angles of ramps defined by the edges of the recesses 40 can be controlled within very close limits. This enables us to generate the angles and lengths of the ramps as a function of the number of friction discs incorporated in a specific brake, and the characteristics of a particular brake-applying sequence.

Figure 3:
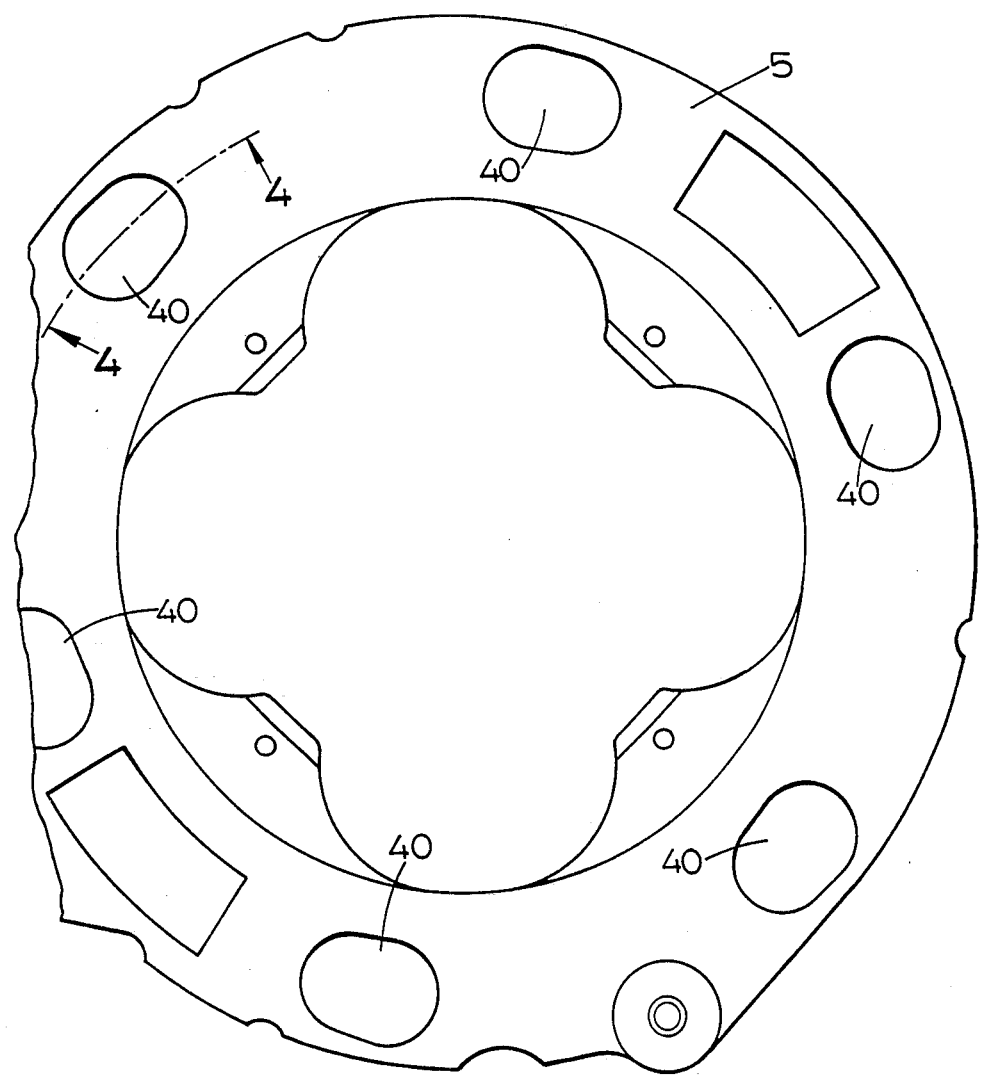
FIG. 3 is a plan of a pressure plate.
Figure 4:
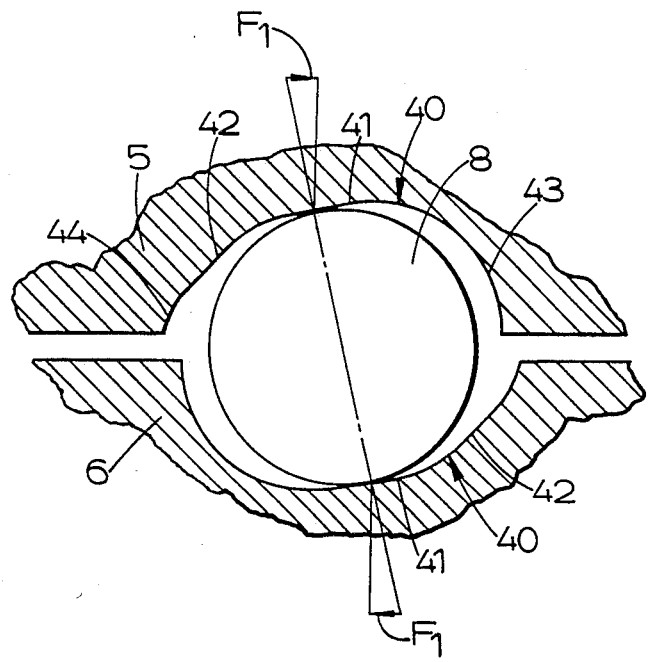
FIG. 4 is a section showing the pressure plates in an inoperative "brake-off" position, the section being taken substantially on the line 4—4 of FIG. 3.
Figure 5:
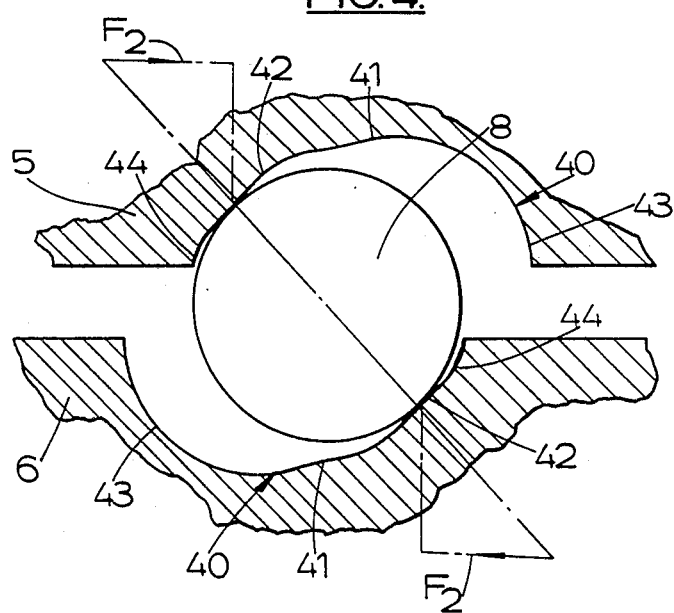
FIG. 5 is a section similar to FIG. 4 with the plate in an operative "brake-applied" position.

As illustrated in FIGS. 3 to 5 of the drawings the recesses 40 in the two plates are oppositely directed and are of truncated configuration each comprising first and second contiguous ramp surfaces 41 and 42 of which the slope of the second surface 42 is substantially steeper than that of the first surface 41. The outer end of the ramp surface 41 terminates in an end portion 43 of a radius substantially equal to that of the ball 8 and with which the ball 8 engages to define the "off" position of the brake with the two pressure plates 5 and 6 urged towards each other into close proximity by return springs acting between the plates 5 and 6. Similarly the outer end of the ramp surface 42 terminates in a circular end portion 44, also of a radius substantially equal to that of the ball 8, and with which the ball 8 engages to define a wear stop preventing further operation of the brake in predetermined, fully worn, position.

When the brake is applied, either hydraulically or mechanically, initial angular movement of the pressure plates in opposite directions causes the balls 8 to move from an inoperative position in engagement with the end portions 43 and up the ramp surfaces 41 to cause the pressure plates 5 and 6 to separate and urge the friction discs 1 into engagement with the radial surfaces 2 and 3 in the housing 4.

When the friction linings on opposite faces of the friction discs 1 are new or relatively unworn, the engagement of the balls 8 with the surfaces 41 is usually sufficient to achieve full application of the brake. However, should the linings be worn substantially, the relative angular movement between the pressure plates 5 and 6 to initiate application of the brake will be greater, with the result that the balls 8 will pass from the ramp surfaces 41 and ride up the steeper ramp surfaces 42. The input effect required to produce a given braking force thus increases noticeably, thereby providing a wear warning device.

The relative input efforts to produce a given braking force for two ramp surfaces 41 and 42 are represented by the forces $F_1$ and $F_2$ in the force diagrams of FIGS. 4 and 5 from which it will be seen that $F_1 < F_2$.

In a fully worn, or substantially fully worn, lining condition the balls 8 ride up and off the ramp surfaces 42 to engage with the end portions 44. The engagement of the balls 8 with the end portions 44 prevents the two pressure plates 5 and 6 from being separated further. This therefore precludes further operation of the brake.

When the brake is operated hydraulically by the hydraulic actuator 15 as described above, the lengths of the recesses 40 and, in particular, the positions of the end portions 44, are chosen with respect to the stroke lengths of the pistons 22 and 23, to ensure that the balls 8 engage with the end portions 44 before the pistons 22 and 23 leave the bore 21. Thus the engagements of the balls 8 with the end portions 44 act as stops limiting movement of the pistons 22 and 23 in outward directions with respect to the bore 21.

This construction is particularly suitable for use with dry brakes when it is particularly desirable to provide an indication, by increasing the input effort, that the linings are worn.

The recesses 40 in each plate 5, 6 described above, which lie on the pitch circle typically of constant diameter, are produced by a cutting tool. The tool is presented to the plate 5, 6 at a steep angle of say 38° and enters the plate to a required distance at a shallower end of a recess 40 to form the surfaces 42 and the circular stop end portions 44, and the angle is then changed to say 17°–20° to form the surfaces 41 and 43, whereafter the tool climbs out. In this method the tool comprises a milling cutter.

Figure 6:
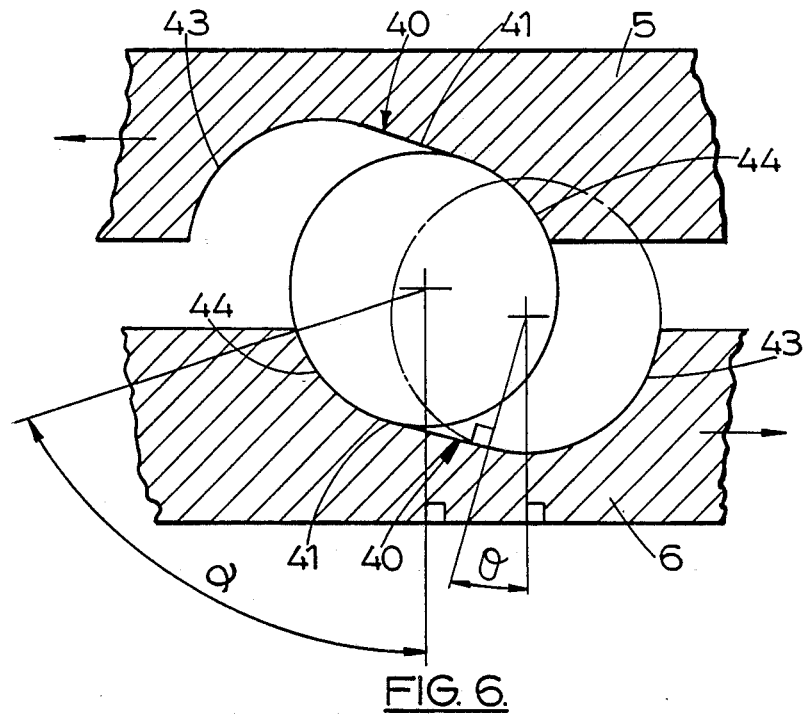
FIG. 6 is a section similar to FIG. 5 with a different configuration of ramp.
Figure 7:
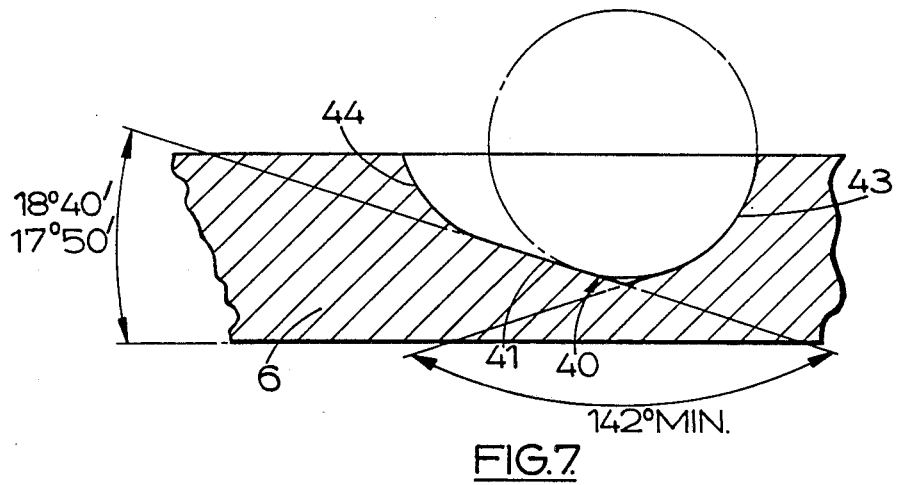
FIG. 7 shows the formation in one pressure plate of the ramp of FIG. 6.

In the construction of FIGS. 6 and 7 the steeper ramp surfaces 42 are omitted, and the ramp surfaces 41 are disposed between the two end portions 43 and 44. In such a brake, which incorporates a plurality of friction discs 1, the lengths of the ramp surfaces 41 depend upon the number of friction discs which are incorporated, and the angles of the ramp surfaces 41 are shallower than the corresponding angles when the pressure plates 5 and 6 are used with a dry brake.

In the construction of FIGS. 6 and 7 the normal working ramp angle of the surface 41 is indicated by $\theta$ and the final ramp angle 44 by $\alpha$.

What is claimed is:

1. A self-energising disc brake comprising a housing, first and second axially spaced radial surfaces in said housing, radial pilot lugs in said housing, first and second pressure plates centred on said pilot lugs, adjacent faces of said pressure plates being provided with co-operating oppositely inclined angularly spaced recesses, balls or rollers located in complementary pairs of said recesses, a rotatable friction member disposed between each said pressure plate and an adjacent radial surface, each said member comprising a disc, and first and second linings of friction material for engagement with said pressure plate and said radial surface carried by opposite faces of said disc, and means for moving said pressure plates angularly relative to said housing to initiate application of said brake with said pressure plates also moving axially to urge the friction member into engagement with said radial surface due to a tendency for said balls or rollers to ride up ramps defined by said end faces, said pressure plate thereafter being carried round with said friction member to provide a servo action, wherein said means for moving said pressure plates angularly comprises an hydraulic actuator which is located within said housing, and said actuator comprises a cylinder body which has a bore of which the axis is tangential to said plates and is outside of the plan projection of said plates, and at least one piston for co-operation with a lug on one of said pressure plates working in said bore, the co-operation of said piston with said lug causing said pressure plate to move angularly to initiate application of said brake when hydraulic fluid under pressure is admitted to a pressure space defined in said bore to act on said piston, said engagement of the balls or rollers with said ramps at a predetermined relative angular position between said pressure plates precluding further relative angular movement between said plates in that direction and provides a stop to prevent further movement of said piston in an outward brake-applying direction with respect to said bore, said engagement of said balls or rollers with said ramps to define said stop being chosen to occur at a point before over-application of the brake can cause said piston to travel completely out of said bore.

2. A brake as claimed in claim 1, wherein said recesses are machined directly into the material of said pressure plates and complementary pairs of recesses lie on corresponding pitch circles in said two plates, each said recess comprises an inclined ramp surface terminating at opposite ends in first and second end portions of which said first end portion at the deeper end of said recess is engaged by the ball or roller when said pressure plates are urged towards each other in an "off" position of said brake, and said second end portion is engaged by said ball or roller to preclude the said further relative angular movement between said plates in a brake-applying direction.

3. A self-energising disc brake comprising a housing, first and second axially spaced radial surfaces in said housing, radial pilot lugs in said housing, first and second pressure plates centred on said pilot lugs, adjacent faces of said pressure plates being provided with co-operating oppositely inclined angularly spaced recesses, balls or rollers located in complementary pairs of said recesses, a rotatable friction member disposed between each said pressure plate and an adjacent radial surface, each said member comprising a disc, and first and second linings of friction material for engagement with said pressure plate and said radial surface carried by opposite faces of said disc, and means for moving said pressure plates angularly relative to said housing to initiate application of said brake with said pressure plates also moving axially to urge the friction member into engagement with said radial surface due to a tendency for said balls or rollers to ride up ramps defined by said end faces, said pressure plate thereafter being carried round with said friction member to provide a servo action, wherein said means for moving said pressure plates angularly comprises an hydraulic actuator which is located within said housing, and said actuator comprises a cylinder body which has a bore of which the axis is tangential to said plates, and is outside of the plan projection of said plates, and at least one piston for co-operation with a lug on one of said pressure plates working in said bore, the co-operation of said piston with said lug causing said pressure plate to move angularly to initiate application of said brake when hydraulic fluid under pressure is admitted to a pressure space defined in said bore to act on said piston, said engagement of the balls or rollers with said ramps at a predetermined relative angular position between said pressure plates precluding further relative angular movement between said plates in that direction and provides a stop to prevent further movement of said piston in an outward brake-applying direction with respect to said bore, said engagement of said balls or rollers with said ramps to define said stop being chosen to occur at a point before over-application of the brake can cause said piston to travel completely out of said bore, and wherein said ramps are provided with surfaces of different relative slopes so that the input effort required to produce a given braking force increases noticeably towards the fully worn lining condition, thereby providing a wear warning device for the user.

4. A brake as claimed in claim 2, wherein each said end portion is circular.

5. A brake as claimed in claim 4, wherein each end portion is of a radius substantially equal to that of said respective ball or roller.

6. A brake as claimed in claim 1, wherein said cylinder body is carried by said housing and is provided with a through-bore and a pair of opposed pistons working in said bore are adapted to co-operate at their outer ends between lugs on said pressure plates which are separated when said pressure space is pressurised.

7. A brake as claimed in claim 6, wherein said cylinder body is carried by a part of said housing provided with one of said radial surfaces.

8. A brake as claimed in claim 6, wherein said cylinder body comprises a plate for closing the open end of a casing, which together constitute said housing.

9. A brake as claimed in claim 8, wherein said cylinder body is formed as one-piece casting with said plate.

10. A brake as claimed in claim 1, wherein opposite ends of said cylinder body comprise abutment faces to define drag-taking stop abutments, each adapted to arrest movement of a respective one of said pressure plates in the application of the brake, depending upon the direction of rotation of said friction discs.

* * * * *